SALT CONVEYING SYSTEM

Filed June 25, 1962 2 Sheets-Sheet 1

INVENTORS
ANTHONY TIMMONS
KARL O. ENGSTROM
BY
A. Donham Owen
ATTORNEY

SALT CONVEYING SYSTEM

Filed June 25, 1962 2 Sheets-Sheet 2

INVENTORS
ANTHONY TIMMONS
KARL O. ENGSTROM
BY
[signature]
ATTORNEY

United States Patent Office 3,194,607
Patented July 13, 1965

3,194,607
SALT CONVEYING SYSTEM
Anthony Timmons, San Mateo, and Karl O. Engstrom, Palo Alto, Calif., assignors to Leslie Salt Co., San Francisco, Calif., a corporation of California
Filed June 25, 1962, Ser. No. 205,012
6 Claims. (Cl. 302—28)

This invention relates generally to pneumatic conveying systems for granular particles and more particularly it relates to an apparatus for conveying granular material from a supply source through a conduit and depositing it simultaneously into a plurality of containers. Still more specifically, the invention relates to a diverter valve for such an apparatus.

In almost all commercial food canning processes an essential step is that of adding a predetermined quantity of salt to each open can of food on the canning line before it is sealed. Prior to the present invention, essentially three different methods for accomplishing this salt distribution were used in the canning industry. In one method the salt is dissolved in water and then pumped in the form of brine to various dispensing stations. In another method a salt tablet of a predetermined size is dropped into each of the cans of food. In the third method the dry granulated salt is dispensed in the desired amount directly into each open can. This latter method is more efficient and desirable for most canning operations because it eliminates the manufacturing steps of forming brine or the compressed tablets. Also, it is a more flexible system because the granulated salt can be dispensed automatically into each can on a canning line by a machine that is easily adjusted and controlled to dispense the exact amount required. A typical dispensing device for granulated salt is fully described in the U.S. Patent No. 2,673,017, dated March 23, 1954.

Despite the aforementioned advantages of dry salt dispensing systems, their use has heretofore been limited in canning operation because of the problem of maintaining the supply of granulated salt in each of a plurality of dispenser hoppers. For long sustained canning runs it was not practical to provide a large hopper for each dispenser. Thus, the hoppers for the dispensers had to be loaded manually by distributing salt in 100 pound bags to each dispenser. This procedure required extra labor and was time-consuming. Moreover, the amount of salt in the hoppers had to be closely watched because if the hoppers were inadvertently emptied during a canning run many cans would go through the line unsalted.

It is, therefore, one principal object of the present invention to solve the aforementioned problem by providing an apparatus for constantly supplying salt to the hoppers of dispensing machines of the canning line so that they will not exhaust their supply of salt at any time during a canning run.

Another object of the invention is to provide a means for discharging a granular material at a controllable rate from a moving air stream to each of a series of containers such as the hoppers of dispensing devices.

Another object of my invention is to eliminate the labor and manhandling of salt in bulk containers in canning systems by supplying it in a steady continuous dry stream from a central source to a plurality of dispensing machines.

Another object of the invention is to provide a system for supplying salt to each of of a plurality of containers wherein the rate of supply salt to each of the containers can be varied independently.

Another object of the invention is to provide a pneumatic salt conveying system for supplying a plurality of containers wherein the filling of one container will not interrupt the flow of salt to other containers.

A further object of the invention is to provide a pneumatic conveying system for discharging granular material through a plurality of outlets that is self-purging when one or more of its discharge outlets is clogged or overloaded and which also recaptures any excess granular material not discharged for recirculation in the system.

Still another object of the invention is to provide a salt conveying system that is simple and inexpensive to construct and also relatively easy to maintain. This latter feature is extremely important because in the canning industry it is essential that equipment be reliable and easy to maintain. Skilled labor and special tools are often not available, and shut-downs due to malfunctions are costly.

The present invention contemplates a pneumatic conveying system comprising a central supply hopper from which the granular salt is conveyed pneumatically to a plurality of dispenser hoppers through a single conduit. A particularly unique feature of the invention comprises a series of novel controllable diverter valves each of which extracts a portion of the entrained salt particles in the air-stream and discharges it into a collecting hopper. The diverter valves are relatively simple in construction yet highly efficient in operation and they can be easily adjusted to control the amount of salt being removed from the conveying air stream.

Other objects, advantages, and features of the present invention will become apparent from the following detailed description of the invention presented in accordance with 35 USC 112.

Figure 1:
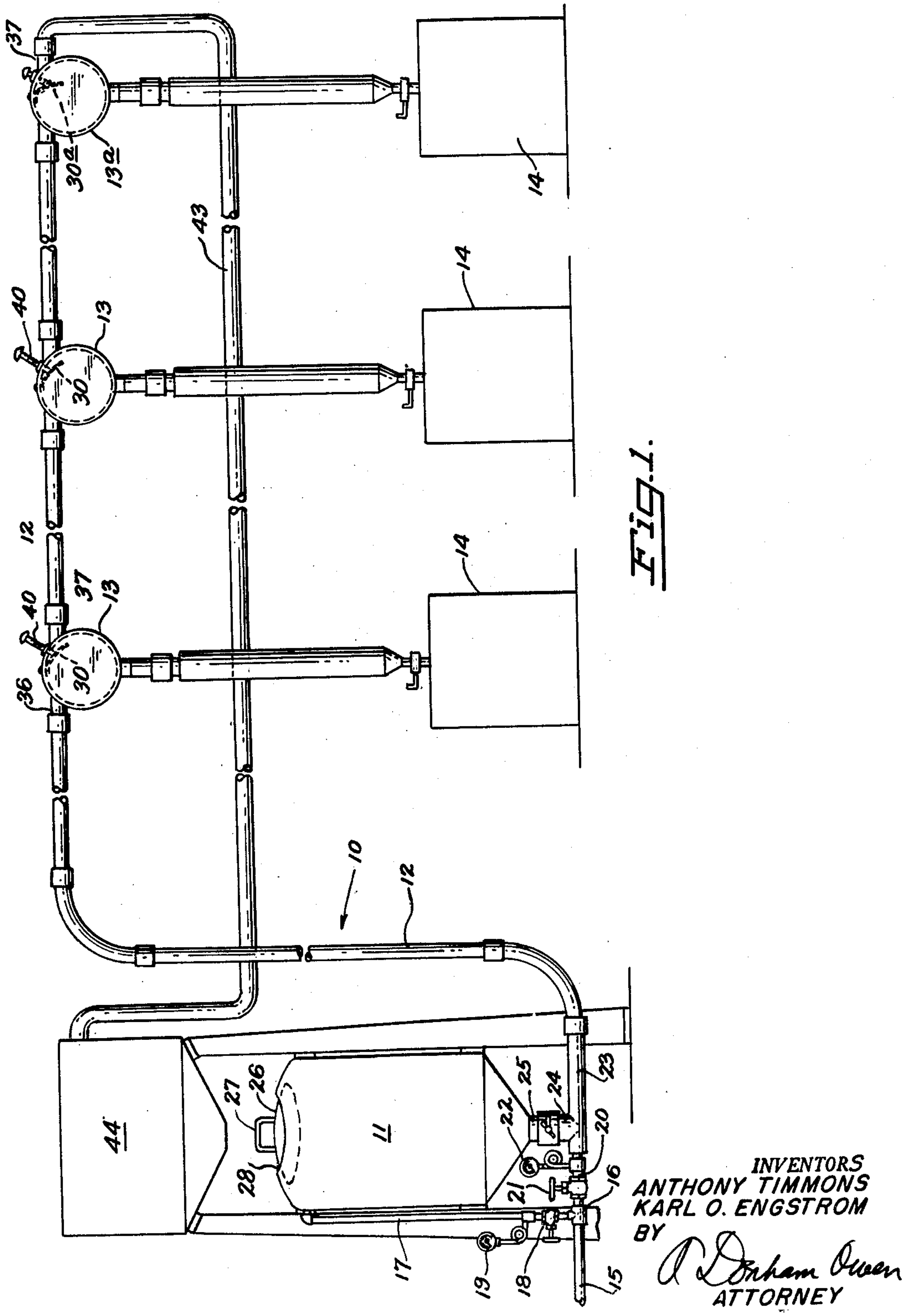
FIG. 1 is a view in elevation showing a pneumatic conveying system for finely divided particles in accordance with the principles of the invention.

Referring to the drawings, FIG. 1 shows a pneumatic salt conveying system 10 for supplying granulated salt to a plurality of dispensing stations in a food canning system. Broadly speaking, the system comprises a pressure vessel 11 attached to a pneumatic conveying conduit 12, both of which are connected to a source of air pressure. Connected in series in the conduit 12 are a number of diverter valves 13, embodying the principles of the invention, each of which is connected to a suitable dispenser device 14. Any reasonable number of diverter valves 13 could be attached to the conduit 12 depending on the number of salt dispensing stations 14 required. However, the three diverter valves 13, as shown, are believed to be a representative number of a typical salt conveying system for a series of canning lines. The dispensing device indicated symbolically by the numeral 14 is a separate apparatus that meters a predetermined amount of salt to each can passing through the canning line. Such a dispensing device, though not an essential part of the present invention, is described in detail in U.S. Patent No. 2,673,017.

The air stream for entraining the salt through the conduit 12 is supplied under pressure (i.e. 100 p.s.i.) from a suitable source through an inlet pipe 15 to a branch T-fitting 16. Extending upward from the T-fitting 16 is a conduit section 17 connected in series to a pressure control valve 18 and a gauge 19 and then to the upper end of the pressure vessel 11. To the other branch of the T-fitting 16 is attached a second pipe section 20 connected to a second pressure control valve 21, a second pressure gauge 22, and then to an end section 23 of the conduit 12. The end conduit section 23 has an upwardly extending branch portion 24 that is connected to an outlet pipe nipple 25 in the bottom of the pressure vessel 11. In the branch portion 24 is fixed a metering orifice or some suitable flow control device such as a simple plug valve through which the salt stored in the pressure vessel 11 can pass. The valves 18 and 21 are preferably controllable, although they could be fixed valves. Their function is to control the air pressure from the common pressure source so that there is a slightly greater pressure in the pipe section 17 than in the conduit section 23. This pressure differential provides an increased internal pressure in the pressure vessel 11 which forces the salt through its outlet 25 at the desired rate.

Figure 4:
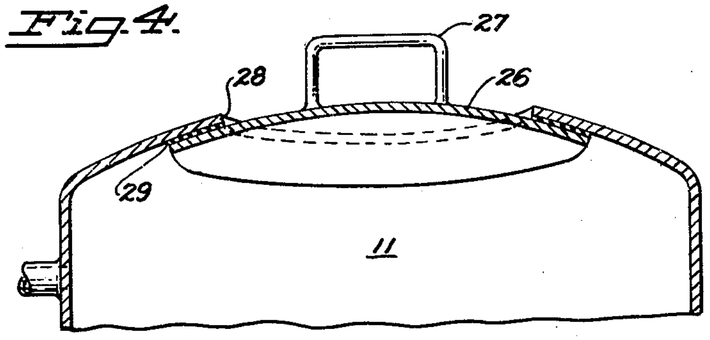
FIG. 4 is an enlarged fragmentary view in elevation and in section showing in detail the upper portion of the main supply hopper of the system in FIG. 1.

The pressure vessel 11 is essentially a metal tank, and as shown in FIG. 4 at its upper end, is provided with a hatch 26 having a handle 27 that facilitates the loading of the pressure vessel with a supply of salt. The hatch is mounted within an opening 28 in the top of the pressure vessel 11 and has a diameter greater than the opening 28 so that the internal pressure will hold it in the closed position against the periphery of the opening. A rubber gasket 29 is fixed around the upper edge of the hatch to aid in providing a fluid-tight seal during the operation of the system.

Figure 2:
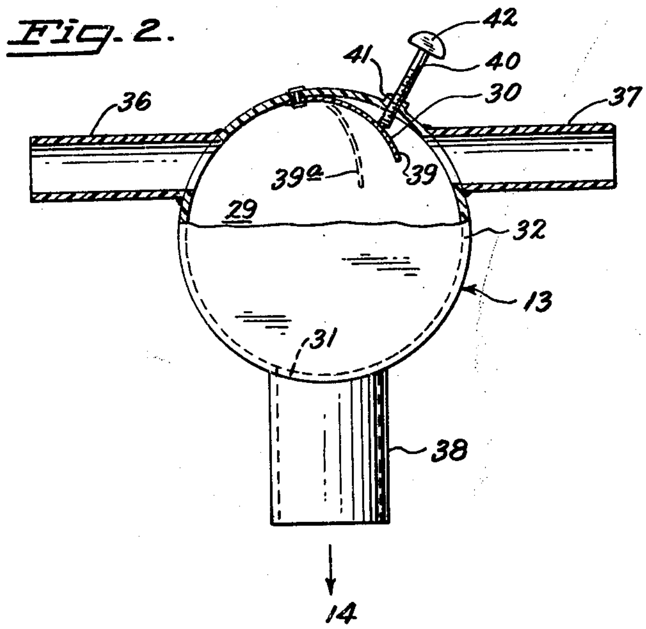
FIG. 2 is an enlarged view in side elevation and in section of a single diverter valve of the system of FIG. 1, the valve is shown in an alternate position in phantom.
Figure 3:
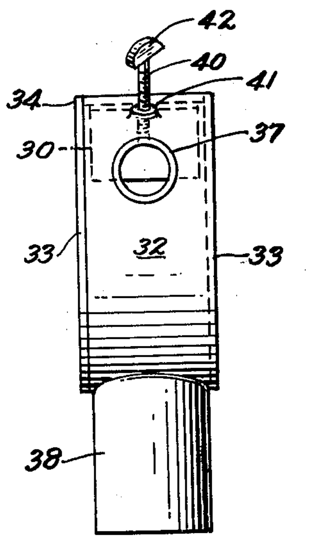
FIG. 3 is an end view in elevation of the diverter valve of FIG. 2.

A diverter valve 13 according to the principles of the invention is shown in the enlarged FIG 2. Generally, it comprises a diversion chamber 29 through which the conveying air in the conduit 12 must pass completely and in which a certain portion of the entrained salt in the air stream is extracted by means of a unique controllable deflector or baffle means 30. The salt removed from the air stream by the deflector means 30 is caused to fall downward and through an opening 31 in the bottom of the chamber 29 and then into a dispensing device 14. The diversion chamber 29 for each diverter valve 13 preferably has a cylindrical shape with an axis that is essentially horizontal and perpendicular to the central axis of the conduit 12, and it can be fabricated from any suitable material such as wood, metal, or plastic. As shown in FIGS. 2 and 3, it essentially comprises a cylindrical wall member 32 connected between two circular end walls 33. The cylindrical wall member 32 is preferably made from some light metal material such as aluminum, and it may be provided with bent over flanges 34 on its edges to which can be attached the end walls 33. The end walls themselves are preferably made from some rigid translucent plastic material that will enable the internal operation of the valve 13 to be checked visually. Such plastic material can be easily fabricated and attached to the cylindrical wall flanges 34 by rivets or a suitable adhesive bonding material.

Extending from opposite sides of the cylindrical wall 32 near the upper portion of the chamber 29 are a pair of aligned pipe sections 36 and 37 that are connected to the conduit 12 and which provide the inlet and outlet openings for the air passing through the chamber 29. A similar pipe section 38 may extend from the opening

31 in the bottom of the chamber 29 to connect with a dispensing device 14.

The deflector means 30 within the chamber 29 comprises a movable curved shaped member that is attached to the upper inside surface of the cylindrical wall member 32 forming the chamber 29. It is preferred that this baffle member also be made of resilient plastic material although it could be made from a light metal, and it may be bonded or riveted at one end only to the cylindrical wall member so that its unattached end 39 extends downstream of the air stream passing through the chamber 29. The degree of curvature of the deflector member 30 may be equal to or slightly less than that of the cylindrical wall member 32, although its elasticity constantly urges it against the cylindrical wall.

When extended downward from the upper inside surface of the cylindrical wall 32 the curved deflector 30 extends across the air stream passing through the chamber 29 by way of the aligned inlet and outlet pipe sections 36 and 37. The entrained salt particles impinging against the deflector 30 are suddenly reduced in velocity or deflected from the air stream and they ultimately fall downward toward the lower end of the chamber 29. By controlling the amount of deflection of the curved member 30 into the air stream, the amount of salt removed from it can be accurately controlled.

The control of the movable deflector 30 is provided by an adjustable set screw 40 that is mounted in the cylindrical wall member 32 near its top. The set screw 40 extends downward toward the central axis of the cylindrical wall member 32 and engages the deflector member 30 near its unattached end 39. To provide it with positive control, the set screw 40 may be threaded through a supporting boss portion 41 on the cylindrical wall member 32 and it may have an enlarged head 42 so that it can be easily turned to move inward against the deflector member 30 causing it to bend about its attached end to control the amount of the deflector's coverage of the air stream and thus the amount of entrained salt particles that will strike it and be removed from the air stream. For example, as shown in FIG. 2, the deflecting member 30 is deflected to cover approximately half of the cross sectional area of the inlet pipe 36 and thus the air stream flowing from it. If more salt is to be diverted from the air stream, the set screw 40 is turned to move it inwardly to deflect the baffle member 30 further downward to cover more of the air stream as shown by the dotted lines designated by numeral 39*a*. This will cause more salt to be removed from the air stream. Similarly, the set screw 40 may be retracted to allow the resilient baffle member 30 to move upward out of the air stream, thus reducing the amount of salt extracted by allowing more of the air stream and the entrained salt particles to pass on unobstructed to other downstream diverter valves 13.

In the diverter valve 13*a* at the end of the conduit 12 as shown in FIG. 1, the diverter or deflector member 30*a* may be deflected to a greater degree and possibly to its full down position since less salt is available in the air stream at this point. Attached to the outlet pipe 37 of this diverter valve 13*a* is a return conduit line 43 through which any excess salt that was not extracted from the air stream by the valves 13 is recirculated to the pressure vessel 11 or to an auxiliary storage hopper 44 above the pressure vessel 11 that may be vented to release the air in the return line.

Briefly summarizing the operation of the pneumatic salt conveying system 10 and the diverter valves 13 according to the present invention, the pressure vessel 11 is first filled with dry salt material to a level below the inlet from the pipe section 15 attached to the air pressure source. The pressure valves 18 and 21 are adjusted so that a greater pressure is supplied to the top of the pressure vessel 11 which maintains the hatch 26 in position and aids the flow of salt through the outlet 25 in the lower end of the pressure vessel 11 and into the conduit 12 where it is entrained in the flow of air originating from the pressure source and passing through the second valve 21.

When the system 10 commences its operation, the set screws 40 for each of the diverter valves 13 are set to hold the deflecting member 28 for each valve in a predetermined fixed position to cause a desired amount of salt to be removed from the air stream. In order to supply each of the dispensing devices 14 connected to the diverter valves 13 with an equal amount of salt from the conduit 12, the deflecting member 30 in each diverter valve 13 is normally deflected to a greater degree in successive diverter valves downstream. Under certain circumstances there may be greater demands for salt in one or more of the dispensers 14. This situation would require that the deflector member 30 for that particular valve 13 be deflected to a greater degree in order to extract a greater amount of salt. In the present invention with the end walls 33 of the valve chambers 29 being made of translucent plastic material, the amount of salt within each chamber 29 may be readily observed, and when the salt is being used at an amount that allows the level to drop near the lower outlet 36 the deflector member 30 can be adjusted downward by its set screw 40 to increase the diversion of salt at this valve. If for some reason the amount of salt being removed is too great for the demand by the dispenser device 14 and the salt builds up within the chamber 29 of a diverter valve 13, the force of the air stream will keep this chamber from blocking the entire system 10 merely by forcing a passage through a collected salt in the chamber 29. However, when this condition is observed over a period of time the most efficient practice would be to adjust the set screw 40 so the deflector member 30 will raise slightly thus decreasing the amount of salt being diverted and allowing a more direct passage of air through the chamber 29.

The aforementioned novel self-purging action of the present invention is an important feature because it assures reliability and it eliminates the need for constant adjustment. When the dispensers 14 in the system fail to use all the salt being supplied by the conduit 12 the excess is efficiently returned by means of the return line 38 to the supply hopper 39. If it appears that too much salt is circulated in the system this can be controlled by adjusting the outlet from the pressure vessel 11 connected to the conduit 12 and feeding pressure supplied to the pressure vessel 11.

From the foregoing it is seen that the present invention provides a unique dry-salt conveying system having important advantages. It should also be apparent that its principles can be applied to other material conveying problems where it is necessary to discharge granular materials in controlled quantities simultaneously to a plurality of stations.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a system for conveying granulated materials in an air stream to a plurality of dispensing stations, said system including a pressure vessel containing a supply of the granulated material and having an outlet connected with a conduit supplied by a source of air under pressure, the combination therewith of a plurality of diverter valves spaced apart along said conduit, each of said valves being adapted to extract an amount of the granulated material from the air stream and comprising: a walled enclosure forming a chamber; axially aligned air inlet and outlet means near the upper end of said chamber for directing the air stream and the particles of granulated material entrained therein into said chamber; a movable baffle member of resiliently deflectable material located in said chamber between its aligned inlet and outlet means; said baffle member having an elongated shape and being fixed at one end only to wall of said enclosure forming a valve chamber, the free end of said baffle member extending downstream of its attached end; means engaging the free end of said baffle member for moving it to a predetermined fixed position across the particle conveying air stream to cover a predetermined portion of the air stream as it enters said chamber; whereby the particles entrained in the covered portion of said air stream are deflected and removed therefrom and are caused to fall downward in said chamber; and material outlet means at the lower end of said chamber adapted to communicate with a supply hopper for the material thus removed from said air stream.

2. The device as described in claim 1 wherein said enclosure is comprised of a cylindrical wall member connected to circular shaped end walls.

3. The device as described in claim 2 wherein at least one of said end walls is formed from a translucent plastic material.

4. The device as described in claim 2 wherein said means for moving said baffle member to its desired position across said fluid stream is an axially adjustable set screw extending through said cylindrical wall member and engaging the free end of said baffle member.

5. In a system for conveying granulated materials in a fluid stream to a plurality of dispensing stations including a pressure vessel containing a supply of the granulated material; a conduit, means for producing a stream of air under pressure through said conduit, an outlet valve for feeding a continuous quantity of granulated material from said vessel into said conduit and into said air stream, a plurality of diverter valves spaced apart along and connected with said conduit, the improvement wherein each said diverter valve comprises a chamber having substantially aligned inlet and outlet means for directing the air stream and particles of granulated material entrained therein into and out of each said chamber; a movable baffle member of resiliently bendable material fixed at one end to a wall member of said chamber; and adjustable set screw mounted in said wall member and bearing against each said baffle member for moving it to a predetermined fixed position away from its attached wall and across a predetermined portion of the air stream passing through said chamber, thereby causing a portion of said granulated material to fall out of the air stream and downward in each said chamber; and material outlet means at the lower end of each said chamber adapted to communicate with a supply hopper for the material thus removed from said fluid stream.

6. In a system for conveying granulated materials in a fluid stream to a plurality of dispensing stations including: a pressure vessel containing a supply of the granulated material; a conduit; means for producing a stream of air under pressure through said conduit; an outlet valve for feeding a continuous quantity of granulated material from said vessel into said conduit and into said air stream; and a plurality of diverter valves spaced apart along and connected with said conduit, the improvement wherein each said diverter valve comprises a chamber having substantially aligned inlet and outlet means for directing the air stream and particles of granulated material entrained therein into and out of each said chamber, each said chamber having a generally cylindrical shape with a curved sidewall and a horizontal central axis, said inlet and outlet means being fixed to its curved sidewall near its upper end; a resilient, yieldable baffle member fixed at one end to the inside of said curved sidewall within the chamber between said inlet and outlet means and normally urged against said sidewall member; adjustable means bearing against said baffle member therein for moving its free end to a predetermined fixed position away from its attached wall and across a predetermined portion of the air stream passing through said chamber, thereby causing a portion of said granulated material to fall out of the air stream and downward in each said chamber; and material outlet means at lower end of each said chamber adapted to communicate with a supply hopper for the material thus removed from said fluid stream.

References Cited by the Examiner

UNITED STATES PATENTS

| | | | |
|---|---|---|---|
| 506,771 | 10/93 | Davis | 302—28 |
| 1,565,893 | 12/25 | Bergman | 302—22 |
| 1,566,517 | 12/25 | Bergman | 302—53 |
| 3,006,367 | 10/61 | Thompson | 137—610 |

FOREIGN PATENTS

| | | |
|---|---|---|
| 497,466 | 5/30 | Germany. |

SAMUEL F. COLEMAN, *Primary Examiner.*

ANDRES H. NIELSEN, WILLIAM B. LA BORDE, *Examiners.*